United States Patent [19]
Bhargava et al.

[11] Patent Number: 6,092,496
[45] Date of Patent: Jul. 25, 2000

[54] COLD STARTING METHOD FOR DIESEL ENGINE WITH VARIABLE VALVE TIMING

[75] Inventors: Sameer Bhargava, Peoria; James J. Faletti, Spring Valley, both of Ill.

[73] Assignee: Caterpillar Inc., Peoria, Ill.

[21] Appl. No.: 09/146,911

[22] Filed: Sep. 4, 1998

[51] Int. Cl.$^7$ ........................................... F02B 29/08
[52] U.S. Cl. ........................... 123/90.15; 123/90.12; 123/179.21; 123/568.14
[58] Field of Search ................ 123/90.11, 90.12, 123/90.15, 90.16, 90.17, 179.21, 568.14

[56] References Cited

U.S. PATENT DOCUMENTS

| | | | |
|---|---|---|---|
| 4,357,917 | 11/1982 | Aoyama | 123/90.16 |
| 4,624,228 | 11/1986 | Sahara et al. | 123/378 |
| 4,945,870 | 8/1990 | Richeson | 123/90.11 |
| 4,987,871 | 1/1991 | Nishikawa | 123/362 |
| 5,086,738 | 2/1992 | Kubis et al. | 123/322 |
| 5,251,590 | 10/1993 | Faletti et al. | 123/179.21 |
| 5,339,777 | 8/1994 | Cannon | 123/90.12 |
| 5,347,966 | 9/1994 | Mahon et al. | 123/179.21 |
| 5,367,990 | 11/1994 | Schechter | 123/90.12 |
| 5,448,973 | 9/1995 | Meyer | 123/90.12 |
| 5,482,013 | 1/1996 | Andrews et al. | 123/179.21 |
| 5,497,737 | 3/1996 | Nakamura | 123/90.15 |
| 5,499,606 | 3/1996 | Robnett et al. | 123/90.12 |
| 5,503,120 | 4/1996 | Shirey et al. | 123/90.12 |
| 5,515,825 | 5/1996 | Arai et al. | 123/413 |
| 5,529,031 | 6/1996 | Yoshioka | 123/90.15 |
| 5,570,667 | 11/1996 | Gray et al. | 123/179.21 |

FOREIGN PATENT DOCUMENTS

| | | |
|---|---|---|
| 969207 | 10/1960 | United Kingdom . |
| 2 274 878 | 8/1994 | United Kingdom . |

*Primary Examiner*—Weilun Lo
*Attorney, Agent, or Firm*—Maginot, Addison & Moore

[57] ABSTRACT

A method of operating a diesel engine is disclosed. The method includes the step of sensing a temperature level associated with the engine. The method further includes the step of positioning the intake valve in the open position during an exhaust stroke of the engine if the temperature level is below a predetermined threshold value, whereby heated exhaust gases advance into the intake conduit during the exhaust stroke so as to heat intake air located in the intake conduit prior to the intake air advancing into the combustion chamber during a subsequent intake stroke. The method yet further includes the step of positioning the intake valve in the closed position during the exhaust stroke if the temperature level is above the predetermined threshold value, whereby heated exhaust gases are prevented from advancing into the intake conduit during the exhaust stroke. A diesel engine is also disclosed.

20 Claims, 2 Drawing Sheets

COLD STARTING METHOD FOR DIESEL ENGINE WITH VARIABLE VALVE TIMING

TECHNICAL FIELD OF THE INVENTION

The present invention relates generally to a diesel engine, and more specifically to a cold starting method for diesel engine with variable valve timing.

BACKGROUND OF THE INVENTION

Diesel engines are a type of compression ignition engine. Compression ignition engines ignite fuel by compressing a quantity of air in a combustion chamber during a compression stroke. In particular, a piston compresses the air within the combustion chamber and the heat generated by the compression of the air increases the temperature within the combustion chamber. Once the temperature in the combustion chamber surpasses a threshold level, fuel injected into the combustion chamber ignites. Ignition and subsequent combustion of the fuel generates high pressure gases which act on the piston which causes a crankshaft of the diesel engine to rotate.

However, the temperature of the air in the combustion chamber at the end of the compression stroke also depends on the temperature of the air entering the combustion chamber prior to the compression stroke. During cold weather, the temperature of the air entering the combustion chamber may be low enough that the temperature rise in the combustion chamber during the compression stroke is not sufficient to raise the temperature of the combustion chamber above the threshold temperature. Under such conditions, the engine will not start or run. Increasing the temperature of the air advanced into the combustion chamber prior to the compression stroke will increase the temperature in the combustion chamber during the compression stroke and cause the injected fuel to ignite in the combustion chamber.

In addition, even under conditions where the fuel does ignite, the temperature in the combustion chamber may not be high enough to completely combust all of the fuel in the combustion chamber. The unburned fuel, also known as unburned hydrocarbons, is exhausted into the atmosphere. These unburned hydrocarbons are a visible form of pollution known as white smoke. Current emission standards limit the amount of unburned hydrocarbons that can be emitted during the operation of the diesel engine. In addition, future emission standards may limit the amount of unburned hydrocarbons that can be emitted into the atmosphere during cold start-up conditions. Increasing the temperature of the air in the combustion chamber prior to the compression stroke will also decrease the amount unburned hydrocarbons advanced into the atmosphere during cold start-up conditions.

Diesel engines heretofore designed have used several devices to increase the temperature of the air advanced into the combustion chamber prior to the compression stroke. These devices include air pre-heaters which heat the air in the intake manifold prior to the air being advanced to the combustion chamber. These pre-heaters add cost and complexity to the design of the diesel engine as the pre-heater requires a fuel burner or electrical heating element to heat the air in the intake manifold. Another solution is to use a coolant heater to heat the engine coolant that surrounds the cylinders. Heating the cylinder walls also increases the temperature of the air in the cylinder. The added cost and complexity of a fuel burner or electrical heating element is required to heat the coolant in the diesel engine. As yet another solution, fuels with lower ignition temperatures, such as ether can be advanced to the combustion chamber to initiate ignition of the diesel fuel. Again, additional costly and complex equipment is required to store a separate fuel that is used only during cold start-up conditions.

What is needed therefore is an improved method and apparatus which increases the temperature in the combustion chamber of a diesel engine during cold start-up conditions. In addition, it is desirable that the method and apparatus does not require additional costly or complex equipment to be added to the diesel engine.

DISCLOSURE OF THE INVENTION

In accordance with a first embodiment of the present invention, there is provided a method of operating a diesel engine. The diesel engine includes (i) an engine block with a piston cylinder defined therein, (ii) an engine head secured to the engine block, (iii) a piston which translates within the piston cylinder wherein the engine block, the engine head, and the piston cooperate to define a combustion chamber, (iv) an intake conduit in fluid communication with the combustion chamber, and (v) an intake valve which is movable between an open position which places the combustion chamber in fluid communication with the intake conduit and a closed position which isolates the combustion chamber from fluid communication with the intake conduit. The method includes the step of sensing a temperature level associated with the engine. The method further includes the step of positioning the intake valve in the open position during an exhaust stroke of the engine if the temperature level is below a predetermined threshold value, whereby heated exhaust gases advance into the intake conduit during the exhaust stroke so as to heat intake air located in the intake conduit prior to the intake air advancing into the combustion chamber during a subsequent intake stroke. The method yet further includes the step of positioning the intake valve in the closed position during the exhaust stroke if the temperature level is above the predetermined threshold value, whereby heated exhaust gases are prevented from advancing into the intake conduit during the exhaust stroke.

In accordance with a second embodiment of the present invention, there is provided a diesel engine. The diesel engine includes an engine block having a piston cylinder defined therein, an engine head secured to the engine block, and a piston which translates within the piston cylinder. The engine block, the engine head, and the piston cooperate to define a combustion chamber. The diesel engine further includes an intake conduit in fluid communication with the combustion chamber, an intake valve which is movable between an open position which places the combustion chamber in fluid communication with the intake conduit and a closed position which isolates the combustion chamber from fluid communication with the intake conduit, and a sensor for sensing a temperature level associated with the engine. The diesel engine yet further includes an engine control unit which is operable to cause the intake valve to be positioned in the open position during an exhaust stroke of the engine if the temperature level is below a predetermined threshold value whereby heated exhaust gases advance into the intake conduit during the exhaust stroke so as to heat intake air located in the intake conduit prior to the intake air advancing into the combustion chamber during a subsequent intake stroke. The control unit is further operable to cause the intake valve to be positioned in the closed position during the exhaust stroke if the temperature level is above the predetermined threshold value whereby heated exhaust gases are prevented from advancing into the intake conduit during the exhaust stroke.

In accordance with a third embodiment of the present invention, there is provided a diesel engine. The diesel engine includes an engine block having a piston cylinder defined therein, an engine head secured to the engine block, and a piston which translates within the piston cylinder. The engine block, the engine head, and the piston cooperate to define a combustion chamber. The diesel engine further includes an intake conduit in fluid communication with the combustion chamber, an intake valve which is movable between an open position which places the combustion chamber in fluid communication with the intake conduit and a closed position which isolates the combustion chamber from fluid communication with the intake conduit, and a sensor for sensing a temperature level associated with the engine and operable to generate a temperature signal in response thereto. The diesel engine yet further includes an engine control unit which is operable to receive the temperature signal and generate (i) a cold start-up signal if the temperature signal indicates that the temperature level is below a predetermined threshold value, and (ii) a normal signal if the temperature signal indicates that temperature level is above the predetermined threshold value. The diesel engine still further includes an actuator which is operable to position the intake valve during the exhaust stroke (i) in the open position in response to receipt of the cold start-up signal whereby heated exhaust gases advance into the intake conduit during the exhaust stroke so as to heat intake air located in the intake conduit prior to the intake air advancing into the combustion chamber during a subsequent intake stroke. The actuator is further operable to position the intake valve during the exhaust stroke in the closed position in response to receipt of the normal signal whereby heated exhaust gases are prevented from advancing into the intake conduit during the exhaust stroke.

BEST MODE FOR CARRYING OUT THE INVENTION

Figure 1:
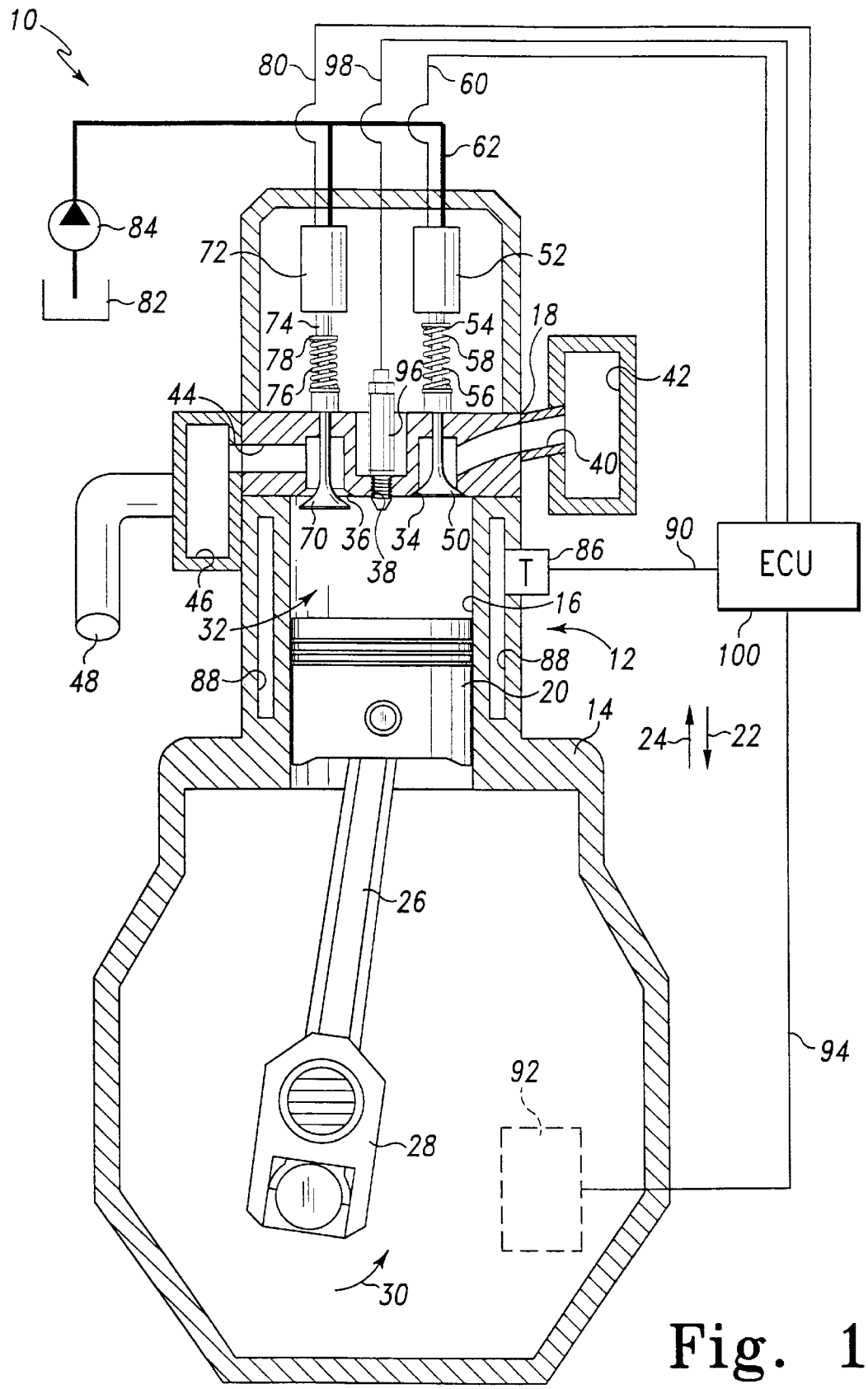
FIG. 1 is a partial cross sectional, partial schematic view of a diesel engine in a normal condition during an exhaust stroke which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
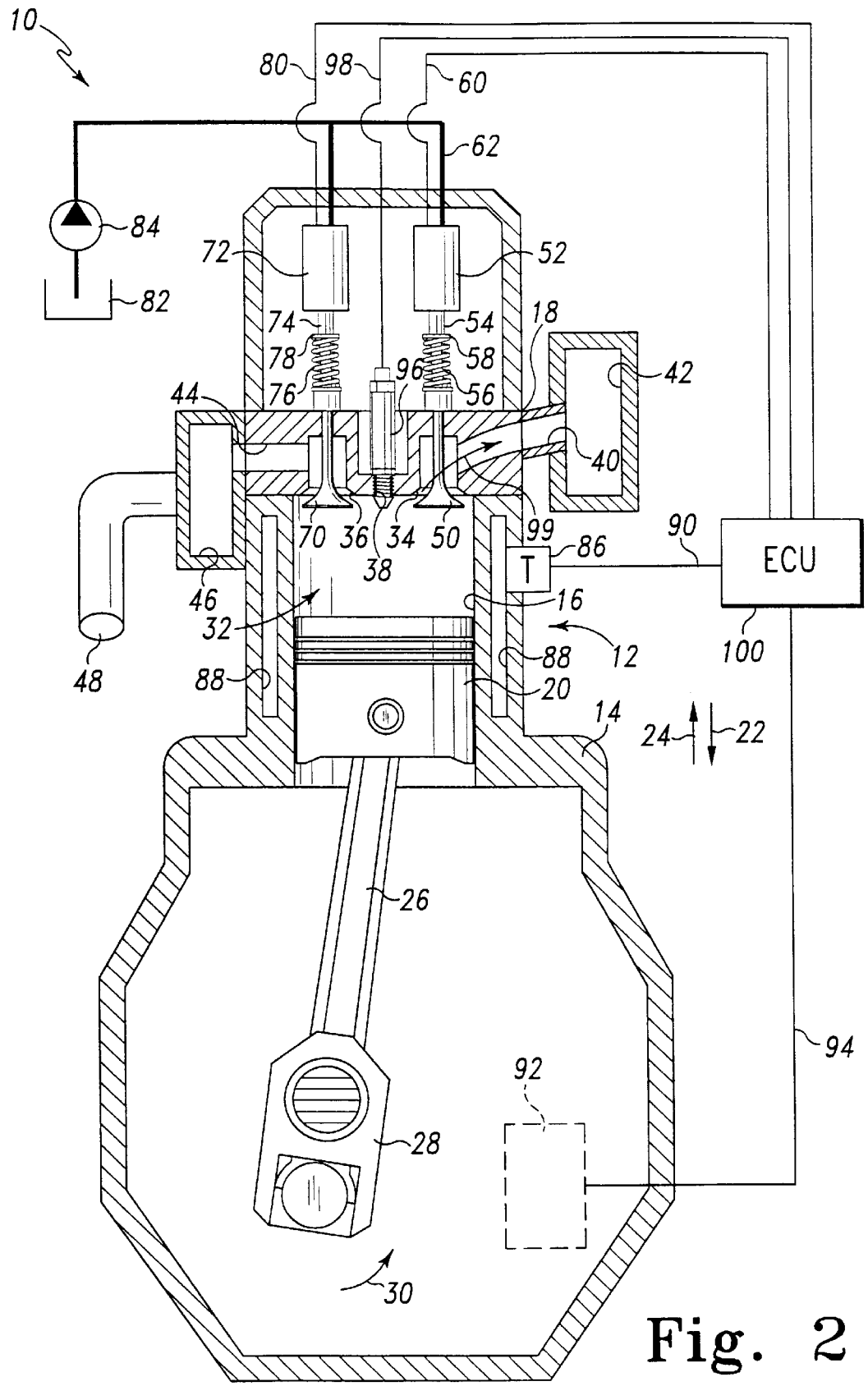
FIG. 2 is a view similar to FIG. 1, but showing the diesel engine during a cold start-up condition during an exhaust stroke.

Referring now to FIGS. 1 and 2, there is shown an engine assembly 10. The engine assembly 10 includes a cylinder assembly 12. The cylinder assembly 12 includes an engine block 14 having a piston cylinder 16 defined therein. An engine head 18 is secured to an upper portion of the engine block 14. The cylinder assembly 12 further includes a piston 20 which translates in the piston cylinder 16 in the general direction of arrows 22 and 24. As the piston 20 moves downwardly in the general direction of arrow 22 to the position shown in FIGS. 1 and 2, a connecting rod 26 secured to the piston 20 urges a crankshaft 28 to rotate in the general direction of arrow 30. Subsequently, as the crankshaft 28 continues to rotate in the general direction of arrow 30, the crankshaft 28 urges the connecting rod 26 and the piston 20 in the general direction of arrow 24 to return the piston 20 to an uppermost position (not shown).

The piston 20, the piston cylinder 16, and the engine head 18 cooperate so as to define a combustion chamber 32. In particular, when the piston 20 is advanced in the general direction of arrow 24, the volume of the combustion chamber 32 is decreased. On the other hand, when the piston 20 is advanced in the general direction of arrow 22, the volume of the combustion chamber 32 is increased as shown in FIGS. 1 and 2.

The engine head 18 has an intake port 34, an exhaust port 36, and a fuel injector opening 38 defined therein. Each of the intake port 34, exhaust port 36, and fuel injector opening 38 are in fluid communication with the combustion chamber 32.

An intake conduit 40 places the intake port 34 in fluid communication with an intake manifold 42. Air is advanced into the intake manifold 42 from an engine air inlet (not shown) prior to being advanced to the intake conduit 40. Similarly, an exhaust conduit 44 places the exhaust port 36 in fluid communication with an exhaust manifold 46. An exhaust outlet 48 in fluid communication with the exhaust manifold 46 allows exhaust gases to advance from the exhaust manifold 46 to a turbocharger (not shown) prior to being advanced to the atmosphere.

An intake valve 50 selectively places the intake manifold 42 in fluid communication with the combustion chamber 32. When the intake valve 50 is placed in the open position (shown in FIG. 2), air may advance from the intake manifold 42 to the combustion chamber 32 via the intake port 34 and the intake conduit 40. Alternately, air may advance from the combustion chamber 32 to the intake manifold 42 via the intake port 34 and the intake conduit 40. When the intake valve 50 is placed in the closed position (Shown in FIG. 1), air is prevented from advancing from the intake manifold 42 to the combustion chamber 32 since the intake valve 50 blocks fluid flow through the intake port 34. In addition, an intake valve spring 56 is interposed between the engine head 18 and a cap 58 on the upper end of the intake valve 50. The intake valve spring 56 applies a bias force to the cap 58 which urges the intake valve 50 in the general direction of arrow 24 so as to place the intake valve 50 in the closed position.

The intake valve 50 is actuated by an electro-hydraulic valve actuator 52. It should be appreciated that numerous types of electro-hydraulic actuators may be used as the actuator 52 in the present invention. One such actuator that is particularly useful as the electro-hydraulic actuator 52 of the present invention is disclosed in U.S. Pat. No. 5,339,777 issued to Cannon, which is hereby incorporated by reference, and which is assigned to the same assignee as the present invention. The electro-hydraulic valve actuator 52 includes a rod 54 which is movable in the general direction of arrows 22 and 24. In particular, when the electro-hydraulic intake valve actuator 52 receives an intake valve control signal via the signal line 60, an internal solenoid (not shown) allows hydraulic pressure from the line 62 to be applied to the rod 54 which causes the rod 54 to advance in the general direction of arrow 22. As the rod advances in the general direction of arrow 22, the force of the rod 54 acting on the cap 58 overcomes the spring bias force of the intake spring 56 thereby allowing the rod 54 to move the intake valve 50 in the general direction of arrow 22. As the rod moves in the general direction of arrow 22, the intake valve is moved from the closed position shown in FIG. 1 to the open position shown in FIG. 2 so as to allow fluid communication between the combustion chamber 32 and the intake manifold 42.

Similarly, when the electro-hydraulic intake valve actuator 52 ceases to receive a control signal via the signal line 60, the internal solenoid removes the hydraulic pressure from the line 62 on the rod 54. As the hydraulic pressure is removed from the rod 54, the spring bias force of the intake valve spring 56 urges the cap 58 and rod 54 in the general direction of arrow 24. As the rod 54 moves in the general direction of arrow 24, the intake valve 50 is moved from the open position shown in FIG. 2 to the closed position shown in FIG. 1 so as to isolate the combustion chamber 32 and the intake conduit 40.

An exhaust valve 70 selectively places the exhaust manifold 44 in fluid communication with the combustion chamber 32. When the exhaust valve 70 is placed in the open position (shown in FIGS. 1 and 2), gases may advance from the combustion chamber 32 to the exhaust manifold 46 via the exhaust port 36 and the exhaust conduit 44. Similarly, gases may advance from the exhaust manifold 46 to the combustion chamber 32 via the exhaust port 36 and the exhaust conduit 44. When the exhaust valve 70 is placed in the closed position (not shown), exhaust gases are prevented from advancing from the combustion chamber 32 to the exhaust manifold 46 since the exhaust valve 70 blocks fluid flow through the exhaust port 36. In addition, an exhaust valve spring 76 is interposed between the engine head 18 and a cap 78 on the upper end of the exhaust valve 70. The exhaust valve spring 76 applies a bias force to the cap 78 which urges the exhaust valve 70 in the general direction of arrow 24 so as to place the exhaust valve 70 in the closed position.

The exhaust valve 70 is actuated by an electro-hydraulic exhaust valve actuator 72 similar to the intake valve actuator 52. The electro-hydraulic exhaust valve actuator 72 includes a rod 74 which is movable in the general direction of arrows 22 and 24. In particular, when the electro-hydraulic exhaust valve actuator 72 receives an exhaust valve control signal via the signal line 80, an internal solenoid (not shown) allows hydraulic pressure from the line 62 to be applied to the rod 74 which causes the rod 74 to advance in the general direction of arrow 22. As the rod advances in the general direction of arrow 22, the force of the rod 74 acting on the cap 78 overcomes the spring bias force of the exhaust spring 76 thereby allowing the rod 74 to move the exhaust valve 70 in the general direction of arrow 22. As the rod 74 moves in the general direction of arrow 22, the exhaust valve is moved from the closed position (not shown) to the open position (shown in FIGS. 1 and 2) so as to allow fluid communication between the combustion chamber 32 and the exhaust manifold 46.

Similarly, when the electro-hydraulic exhaust valve actuator 72 ceases to receive a control signal via the signal line 80, the internal solenoid removes the hydraulic pressure from the line 62 on the rod 74. As the hydraulic pressure is removed from the rod 74, the spring bias force of the exhaust valve spring 76 urges the cap 78 and rod 74 in the general direction of arrow 24. As the rod 74 moves in the general direction of arrow 24, the exhaust valve 70 is moved from the open position shown in FIGS. 1 and 2 to the closed position (not shown) so as to isolate the combustion chamber 32 and the exhaust conduit 44.

The engine assembly 10 further includes a hydraulic fluid reservoir 82 and a hydraulic pump 84. The hydraulic pump 84 draws low pressure hydraulic fluid from the hydraulic fluid reservoir 82 and advances high pressure hydraulic fluid to the electro-hydraulic actuators 52 and 72 via the hydraulic line 62. It should be appreciated that the hydraulic fluid pump 84 provides the high pressure hydraulic fluid which is used to urge the intake valve 50 and the exhaust valve 70 from their respective closed position to their respective open position.

The engine assembly 10 further includes a temperature sensor 86. The temperature sensor 86 is secured to the engine block 14 proximate to the combustion chamber 32. The temperature sensor 86 is operable to measure temperature associated with the engine assembly 10 and generate temperature signals on the signal line 90 in response thereto. In particular, the engine block 14 further has a coolant passage 88 defined therein which surrounds but is not in fluid communication with the combustion chamber 32. Coolant flowing through the coolant passage 88 removes heat from the combustion chamber 32 during operation of the engine assembly 10. The temperature of the coolant in the coolant passage 88 is proportional to the temperature in the combustion chamber 32. Thus, the temperature sensor 86 is placed in thermal communication with the coolant in the coolant passage 88 thereby allowing a relative measurement of the temperature in the combustion chamber 32 without placing the temperature sensor 86 directly in contact with the harsh environment of the combustion chamber 32.

The engine assembly 10 further includes a fuel injector 96 positioned within the fuel injector opening 38. The fuel injector 96 is operable to receive fuel injector control signals via the signal line 98 and advance a quantity of fuel into the combustion chamber 32 in response thereto.

The engine assembly 10 further includes a crank angle sensor 92 which measures the instantaneous position of the crankshaft 28 and generates a crank angle signal on the signal line 94 in response thereto. The crank angle signal provides information necessary to time the opening and closing of the intake valve 50, opening and closing of the exhaust valve 70, and injection of fuel into the combustion chamber 32 with respect to the position of the piston 20.

The engine assembly 10 further includes an engine control unit 100. The engine control unit 100 is operable to receive (i) temperature signals from the temperature sensor 86 via the signal line 90 and (ii) crank angle signals from the crank angle sensor 92 via the signal line 94.

The engine control unit 100 is further operable to generate fuel injector control signals which are sent to the fuel injector 96 via the signal line 98 in response to receiving the temperature signal and crank angle position signal. The injector control signals control the timing and quantity of fuel injected by the fuel injector 96 into the combustion chamber 32.

The engine control unit 100 is yet further operable to generate intake valve control signals and exhaust valve control signals in response to receiving the temperature signal and crank angle position signal. The intake valve control signals are sent to the intake valve actuator 52 via the signal line 60 so as to cause the intake valve actuator 52 to position the intake valve 50. The exhaust valve control signals are sent to the exhaust valve actuator 72 via the signal line 80 so as to cause the exhaust valve actuator 72 to position the exhaust valve 70.

In addition, the engine control unit 100 determines when the engine is running in a normal condition or a cold start-up condition. The engine control unit 100 compares the temperature signal received via the signal line 90 to a predetermined threshold value. If the temperature signal indicates that the temperature level of the engine coolant in the passage 88 is above the predetermined threshold value of about seventy degrees Fahrenheit, then a normal control signal is generated. If the temperature signal indicates that the temperature level of the engine coolant in the passage 88 is below the predetermined threshold value of about seventy degrees Fahrenheit, then a cold start-up control signal is generated.

In order to provide meaning to the phrase "normal condition" as it is used herein, it should be understood that the engine assembly 10 is in the normal condition when the temperature signal indicates that the coolant temperature level of the coolant in the passage 88 is above the predetermined threshold value of seventy degrees Fahrenheit. It should be appreciated that the temperature in the combustion chamber 32 will be greater than the temperature of the coolant in the passage 88 as heat is dissipated into engine block 14, engine head 12, and engine coolant in the passages 88. During the normal condition, exhaust products produced during the combustion of air and fuel in the combustion chamber 32 do not contain excessive unburned hydrocarbons which produce white smoke.

Moreover, in order to provide meaning to the phrase "cold start-up condition" as it is used herein, it should be understood that the engine assembly 10 is in a cold start-up condition when the temperature signal indicates that the coolant temperature level of the coolant in the passage 88 is below the predetermined threshold value of seventy degrees Fahrenheit. During the cold start-up condition, the fuel may not combust in the combustion chamber during a compression stroke. In addition, if the fuel partially combusts in the combustion chamber 32, the exhaust products produced during the combustion process will contain excessive unburned hydrocarbons or white smoke.

Industrial Applicability

In operation, the engine assembly 10 operates in a four stroke cycle which includes an intake stroke, a compression stroke, a power stroke, and an exhaust stroke. It should be appreciated that the engine control unit 100 determines when each of the respective strokes begins and ends by monitoring the crankshaft angle signals received via the signal line 94.

The first stroke is the intake stroke, during which the exhaust valve 70 is positioned in the closed position (not shown) by the spring bias of the exhaust valve spring 76. The engine control unit 100 generates an intake valve control signal which is sent to the intake valve actuator 52 causing the intake valve 50 to be positioned in the open position as shown in FIG. 2. The spring bias of the exhaust spring 76 urges the exhaust valve into the closed position. During the intake stroke, the piston 20 is advanced downwardly in the general direction of arrow 22 thereby creating a low pressure in the combustion chamber 32. This low pressure draws air from the intake conduit 40 downwardly into the combustion chamber 32.

Advancing to the compression stroke, the intake valve 50 and the exhaust valve 70 are both positioned in their respective closed positions by the respective springs 56 and 76. As the piston 20 moves upwardly in the general direction of arrow 25, it compresses the air in the combustion chamber 32. The compression of the air in the combustion chamber 32 greatly increases the temperature of the air in the combustion chamber 32. Near the end of the compression stroke, the engine control unit 100 generates a fuel injector control signal on the signal line 98 which causes the fuel injector 96 to inject fuel into the combustion chamber 32. The injection of the fuel into the heated air present in the combustion chamber 32 ignites the fuel.

The combustion of the fuel and air in the combustion chamber 32 advances the engine assembly 10 to the power stroke in which the intake valve 50 and the exhaust valve 70 are both positioned in their respective closed positions by the spring bias force of the respective springs 56 and 76. As the fuel and air are combusted, exhaust gases are formed. The formation of exhaust gases generates heat and pressure which acts upon the piston 20 to drive the piston 20 in the general direction of arrow 22. Movement of the piston 20 in the general direction of arrow 22 causes the crankshaft 28 to rotate in the general direction of arrow 30.

Thereafter, the engine assembly 10 is advanced to an exhaust stroke. During the exhaust stroke, the engine control unit 100 determines if the engine assembly 10 is in the normal condition or the cold start-up condition. To determine if the engine assembly 10 is in the normal condition or the cold start-up condition, the engine control unit 100 compares the temperature signal received on the signal line 90 to a predetermined threshold value stored in the engine control unit 100. The predetermined threshold value corresponds to a coolant temperature level of approximately seventy degrees Fahrenheit. If the temperature signal indicates a temperature level greater than or equal to the predetermined threshold value, the engine control unit 100 determines that the engine assembly 10 is in the normal condition and generates the normal control signal in response thereto. If the temperature signal indicates a temperature level less than the predetermined threshold value, then the engine control unit 100 determines that the engine assembly 10 is in the cold start-up condition and generates a cold start-up control signal in response thereto.

FIG. 1 shows the engine assembly 10 during an exhaust stroke while the engine is in the normal condition. The engine control unit 100 generates an exhaust valve control signal which causes exhaust valve actuator 72 to position the exhaust valve 70 in the open position. The normal intake valve control signal recieved via the signal line 60 allows the intake valve spring 56 to position the intake valve 50 in the closed position. Since the pressure generated by the formation of exhaust gases in the combustion chamber 32 is greater than the pressure in the exhaust conduit 44, the exhaust gases advance from the combustion chamber 32, through the exhaust port 36, through the exhaust conduit 44, through the exhaust manifold 48, and into the exhaust outlet 48. From the exhaust conduit 48, exhaust gases maybe advanced to a turbocharger (not shown) prior to being exhausted to the atmosphere. It should be noted that in the normal condition, most of the heat generated by compressing the air and combusting the fuel in the combustion chamber 32 is removed from the combustion chamber 32 with the exhaust gases advanced to the exhaust conduit 44.

FIG. 2 shows the engine assembly 10 during an exhaust stroke while the engine is in the cold start-up condition. The engine control unit 100 generates an exhaust valve control signal which causes exhaust valve actuator 72 to position the exhaust valve 70 in the open position. A cold start-up intake valve control signal received via the signal line 60 causes the intake valve actuator 52 to position the intake valve 50 in the open position. Since the pressure generated by formation of exhaust gases in the combustion chamber 32 is greater than the pressure in the exhaust conduit 44, the exhaust gases advance from the combustion chamber 32, through the exhaust port 36, through the exhaust conduit 44, through the exhaust manifold 48, and into the exhaust outlet 48. Similarly, as the piston 20 advances in the general direction of arrow 24, exhaust gases advance from the combustion chamber 32, through the intake port 36, and to the intake conduit 40 via the path indicated by arrow 99. Additionally, it has been found that closing the exhaust valve 70 early in the exhaust stroke, for example thirty degrees before top dead center, increases the amount of exhaust gases advanced from the combustion chamber 32 to the intake conduit 40.

It should be noted that in the cold start-up condition, some of the heat generated by compressing the air and combusting the fuel in the combustion chamber 32 is removed from the combustion chamber 32 with the exhaust gases that are advanced to the intake conduit 40. This heat preheats the air in the intake conduit 40 before the air is advanced to the combustion chamber 32. During a subsequent intake stroke, this preheated air is advanced to the combustion chamber 32 thereby increasing the temperature of the air in the combustion chamber 32 prior to a subsequent compression stroke. During the subsequent compression stroke, the compression of the air within the combustion chamber 32 adds additional heat to preheated air already present the combustion chamber 32 thereby increasing the temperature in the combustion chamber 32 beyond the temperature level that could be generated by compressing the air without preheating the air in the intake conduit 40.

The process of advancing exhaust gases to the intake conduit 40 during the exhaust stroke to preheat the air in the intake conduit 40 is repeated until the temperature sensor 86 returns a temperature signal to the engine control unit 100 that indicates a coolant temperature level greater than the predetermined threshold value. It should be appreciated that this method of increasing the temperature in the combustion chamber 32 during the cold start-up condition requires only the equipment already present in a diesel engine with variable valve timing using an electro-hydraulic actuator.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, although the temperature sensor 86 is described herein as is positioned in thermal communication with the coolant in the passage 88 of the engine block 14, and has significant advantages thereby in the present invention, the temperature sensor 86 could be positioned in contact with the any mechanical component that describes the combustion chamber 32 (e.g. the engine block 14). In addition, the temperature sensor 86 could be positioned in contact with the exhaust manifold 46 or engine lubricant to determine the temperature level associated with the engine.

What is claim is:

1. A method of operating a diesel engine having (i) an engine block with a piston cylinder defined therein, (ii) an engine head secured to the engine block, (iii) a piston which translates within the piston cylinder wherein the engine block, the engine head, and the piston cooperate to define a combustion chamber, (iv) an intake conduit in fluid communication with the combustion chamber, and (v) an intake valve which is movable between an open position which places the combustion chamber in fluid communication with the intake conduit and a closed position which isolates the combustion chamber from fluid communication with the intake conduit, comprising the steps of:

sensing a temperature level associated with the engine;

positioning the intake valve in the open position during an exhaust stroke of the engine if the temperature level is below a predetermined threshold value, whereby heated exhaust gases advance into the intake conduit during the exhaust stroke so as to heat intake air located in the intake conduit prior to the intake air advancing into the combustion chamber during a subsequent intake stroke; and positioning the intake valve in the closed position during the exhaust stroke if the temperature level is above the predetermined threshold value, whereby heated exhaust gases are prevented from advancing into the intake conduit during the exhaust stroke.

2. The method of claim 1, wherein:

the engine block has a cooling passage defined therein through which a coolant flows, and the temperature level sensing step includes the step of measuring the temperature level of the coolant and generating a temperature signal in response thereto.

3. The method of claim 2, wherein:

the engine further includes a temperature sensor for generating the temperature signal, and the temperature sensor is secured to the engine block so as to be in thermal communication with the coolant.

4. The method of claim 3, wherein:

the engine includes an engine control unit which is operable to receive the temperature signal and generate (i) a cold start-up signal if the temperature signal indicates that the temperature level is below the predetermined threshold value, and (ii) a normal signal if the temperature signal indicates that temperature level is above the predetermined threshold value, and the engine further includes an actuator which is operable to position the intake valve during the exhaust stroke (i) in the open position in response to receipt of the cold start-up signal, and (ii) in the closed position in response to receipt of the normal signal.

5. The method of claim 1, wherein:

the predetermined threshold value is equal to about X, and $$50° < X < 80° \text{ F}.$$

6. The method of claim 5, wherein X=70° F.

7. The method of claim 4, wherein the actuator is an electro-hydraulic actuator.

8. A diesel engine, comprising:

an engine block having a piston cylinder defined therein;

an engine head secured to said engine block;

a piston which translates within said piston cylinder, wherein said engine block, said engine head, and said piston cooperate to define a combustion chamber;

an intake conduit in fluid communication with said combustion chamber; and an intake valve which is movable between an open position which places said combustion chamber in fluid communication with said intake conduit and a closed position which isolates said combustion chamber from fluid communication with said intake conduit;

a temperature sensor for sensing a temperature level associated with said engine; and an engine control unit which is operable to cause said intake valve to be positioned (i) in said open position during an exhaust stroke of said engine if said temperature level is below a predetermined threshold value, whereby heated exhaust gases advance into said intake conduit during said exhaust stroke so as to heat intake air located in said intake conduit prior to said intake air advancing into said combustion chamber during a subsequent intake stroke, and (ii) in said closed position during said exhaust stroke if said temperature level is above said predetermined threshold value, whereby heated exhaust gases are prevented from advancing into said intake conduit during said exhaust stroke.

9. The engine of claim 8, wherein:

said engine block has a cooling passage defined therein through which a coolant flows, and said temperature sensor measures said temperature level of said coolant and generates a temperature signal in response thereto.

10. The engine of claim 9, wherein said temperature sensor is secured to said engine block so as to be in thermal communication with said coolant.

11. The engine of claim 9, further comprising an actuator which is operable to position said intake valve during said exhaust stroke (i) in said open position in response to receipt of said cold start-up signal, and (ii) in said closed position in response to receipt of said normal signal.

12. The engine of claim 8, wherein:

said predetermined threshold value is equal to about X, and $50° < X < 80°$ F.

13. The engine of claim 12, wherein X=70° F.

14. The engine of claim 11, wherein said actuator is an electro-hydraulic actuator.

15. A diesel engine, comprising:

an engine block having a piston cylinder defined therein;

an engine head secured to said engine block;

a piston which translates within said piston cylinder, wherein said engine block, said engine head, and said piston cooperate to define a combustion chamber;

an intake conduit in fluid communication with said combustion chamber; and an intake valve which is movable between an open position which places said combustion chamber in fluid communication with said intake conduit and a closed position which isolates said combustion chamber from fluid communication with said intake conduit;

a temperature sensor for sensing a temperature level associated with said engine and generating a temperature signal in response thereto;

an engine control unit which is operable to receive said temperature signal and generate (i) a cold start-up signal if said temperature signal indicates that said temperature level is below said predetermined threshold value, and (ii) a normal signal if said temperature signal indicates that temperature level is above said predetermined threshold value; and an actuator which is operable to position said intake valve during said exhaust stroke (i) in said open position in response to receipt of said cold start-up signal whereby heated exhaust gases advance into said intake conduit during said exhaust stroke so as to heat intake air located in said intake conduit prior to said intake air advancing into said combustion chamber during a subsequent intake stroke, and (ii) in said closed position in response to receipt of said normal signal whereby heated exhaust gases are prevented from advancing into said intake conduit during said exhaust stroke.

16. The engine of claim 15, wherein:

said engine block has a cooling passage defined therein through which a coolant flows, and said temperature sensor measures said temperature level of said coolant and generates a temperature signal in response thereto.

17. The engine of claim 16, wherein said temperature sensor is secured to said engine block so as to be in thermal communication with said coolant.

18. The engine of claim 15, wherein:

said predetermined threshold value is equal to about X, and $50° < X < 80°$ F.

19. The engine of claim 18, wherein X=70° F.

20. The engine of claim 15, wherein said actuator is an electro-hydraulic actuator.

* * * * *